United States Patent
Oblizajek et al.

(10) Patent No.: US 9,885,638 B2
(45) Date of Patent: Feb. 6, 2018

(54) SYSTEMS AND METHODS FOR DETERMINING STEERING PERFORMANCE

(71) Applicant: GM GLOBAL TECHNOLOGY OPERATIONS LLC, Detroit, MI (US)

(72) Inventors: Kenneth L. Oblizajek, Troy, MI (US); John D. Sopoci, Commerce Township, MI (US); Ian Y. Hwa, West Bloomfield, MI (US)

(73) Assignee: GM Global Technology Operations LLC, Detroit, MI (US)

(*) Notice: Subject to any disclaimer, the term of this patent is extended or adjusted under 35 U.S.C. 154(b) by 290 days.

(21) Appl. No.: 14/690,654

(22) Filed: Apr. 20, 2015

(65) Prior Publication Data

US 2016/0305852 A1    Oct. 20, 2016

(51) Int. Cl.
   *G01M 17/06* (2006.01)

(52) U.S. Cl.
   CPC .................. *G01M 17/06* (2013.01)

(58) Field of Classification Search
   CPC .... G01M 17/06; G01M 13/027; G01M 7/027; B62D 5/0481
   See application file for complete search history.

(56) References Cited

U.S. PATENT DOCUMENTS

| | | | | |
|---|---|---|---|---|
| 4,658,656 A * | 4/1987 | Haeg | .................. | G01M 13/027 73/669 |
| 4,672,844 A * | 6/1987 | Meyer | .................. | G01M 17/06 73/116.01 |
| 5,700,951 A * | 12/1997 | Sagiyama | .............. | G01M 17/06 73/11.04 |
| 6,262,551 B1 * | 7/2001 | Clark | .................... | G01M 17/06 180/444 |
| 7,350,395 B2 * | 4/2008 | Lee | ........................ | G01M 17/06 73/11.07 |
| 7,742,899 B2 * | 6/2010 | Lemont, Jr. | ............ | G01M 7/027 180/427 |
| 7,765,858 B2 * | 8/2010 | Oblizajek | .............. | G01M 17/06 73/117.02 |
| 9,574,972 B2 * | 2/2017 | Oblizajek | .............. | G01M 17/06 |
| 9,604,665 B2 * | 3/2017 | Hwa | ....................... | B62D 5/046 |
| 2010/0031739 A1 * | 2/2010 | Oblizajek | .............. | G01M 17/06 73/117.02 |
| 2012/0173079 A1 * | 7/2012 | Oblizajek | .............. | G01M 17/06 701/41 |
| 2016/0362130 A1 * | 12/2016 | Hwa | ..................... | B62D 5/0409 |
| 2016/0362131 A1 * | 12/2016 | Hwa | ..................... | B62D 5/0457 |

* cited by examiner

*Primary Examiner* — Freddie Kirkland, III
(74) *Attorney, Agent, or Firm* — Lorenz & Kopf, LLP

(57) ABSTRACT

Methods and apparatus are provided for determining steering performance. The method includes coupling at least one load source to the steering system, and coupling a portion of the steering system to an angle input source. The method also includes outputting one or more control signals by a processor to the at least one load source to apply a load to the steering system and outputting one or more control signals by the processor to the angle input source to apply an input to the steering system. The method includes receiving torque data indicating a performance of the steering system based on the load applied to the steering system by the at least one load source and the input applied by the angle input source.

13 Claims, 8 Drawing Sheets

SYSTEMS AND METHODS FOR DETERMINING STEERING PERFORMANCE

TECHNICAL FIELD

The present disclosure generally relates to steering systems and more particularly relates to systems and methods for determining performance of a steering gear associated with a steering system.

BACKGROUND

Many vehicles include a steering system to enable the operator to maneuver or steer the vehicle. In one example, the steering system includes a steering gear coupled to a hand wheel. The steering gear transmits the operator input from the hand wheel to the one or more road wheels. In some instances, steering gears may transmit vibrations from the one or more road wheels to the operator. Such vibrations may be undesirable to the operator.

Accordingly, it is desirable to provide systems and methods for determining steering performance to reduce undesired vibrations. Furthermore, other desirable features and characteristics of the present invention will become apparent from the subsequent detailed description and the appended claims, taken in conjunction with the accompanying drawings and the foregoing technical field and background.

SUMMARY

In one embodiment, a method is provided for determining a performance of a steering system. The method includes coupling at least one load source to the steering system and coupling a portion of the steering system to an angle input source. The method also includes outputting one or more control signals by a processor to the at least one load source to apply a load to the steering system and outputting one or more control signals by the processor to the angle input source to apply an input to the steering system. The method includes receiving torque data indicating a performance of the steering system based on the load applied to the steering system by the at least one load source and the input applied by the angle input source.

In one embodiment, a system for determining a performance of a steering system is provided. The system includes a testing structure coupled to the steering system. The system includes at least one load source coupled to the steering system to apply a load to the steering system. The system also includes an angle input source coupled to the steering system to apply an input to the steering system. The system also includes a diagnostic module that outputs one or more control signals to the at least one load source and the angle input source, and receives torque data indicating the performance of the steering system based on the output.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of steering systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
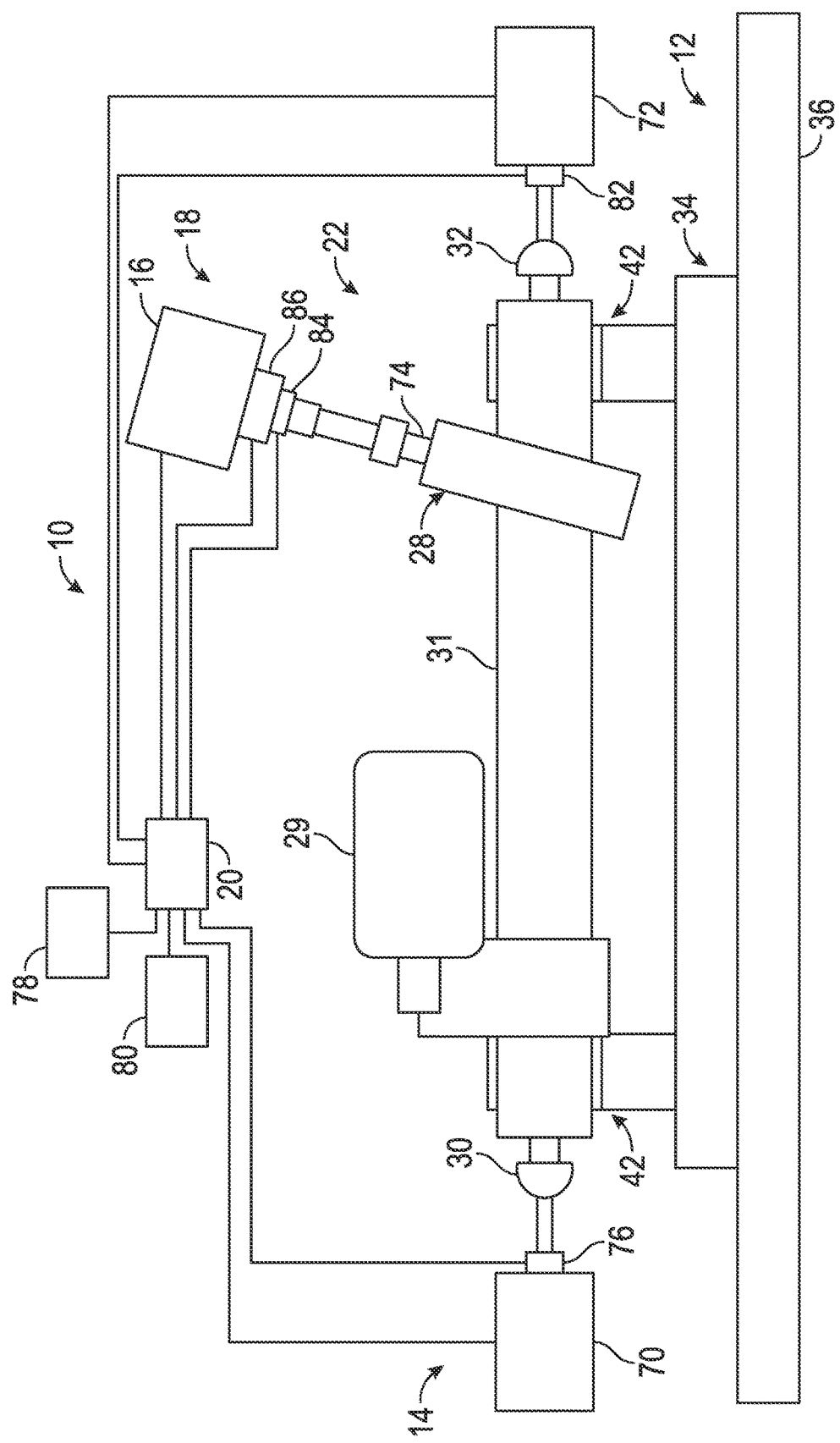
FIG. 1 is a schematic illustration of a system for determining steering performance of a steering gear in accordance with various embodiments.

With reference to FIG. 1, one example of a system 10 for determining steering system performance is shown. The system 10 includes a testing structure 12, at least one load source 14, an angle input source 16, at least one sensor 18 and a diagnostic module 20 in accordance with various embodiments. As will be discussed further herein, the system 10 enables the determination of a performance of a steering system 22 coupled to the testing structure 12. Although the figures shown herein depict an example with certain arrangements of elements, additional intervening elements, devices, features, or components may be present in an actual embodiment. It should also be understood that FIG. 1 is merely illustrative and may not be drawn to scale.

The testing structure 12 supports the steering system 22 and can support one or more of the at least one load source 14, the angle input source 16, the at least one sensor 18 and the diagnostic module 20. In one example, the steering system 22 is a steering system for use with a vehicle. The vehicle may be an automobile, an aircraft, a spacecraft, a watercraft, a sport utility vehicle, or any other type of vehicle. For exemplary purposes the disclosure will be discussed in the context of the steering system 22 being used with an automobile. As can be appreciated, the systems and methods of the present disclosure are not limited to an automobile, as the methods and systems for determining steering system performance can be implemented with a variety of steering systems or steering gears that accept input for maneuvering a vehicle. Thus, the steering system 22 illustrated and described herein is merely exemplary. In the example of FIG. 1, the steering system 22 is a rack and pinion based electric power steering system. It should be noted that the steering system 22 is merely exemplary, and the steering system 22 need not comprise an electric power steering system. Rather, the steering system 22 can comprise a hydraulic based steering system.

As a steering system 22 for an automobile can be generally known, the steering system 22 will not be discussed in great detail herein. Briefly, however, in this example, the steering system 22 includes a steering gear 28, a steering assist unit 29, a first tie-rod 30 and a second tie-rod 32. The steering gear 28 is coupled to the first tie-rod 30 and the second tie-rod 32. The steering gear 28 receives rotational input from the angle input source 16, and through a suitable gearing, converts the rotational input into translational input to a belt-drive rack electric power system 31, and the steering assist unit 29 assists the belt-drive rack electric power system 31 to move the first tie-rod 30 and the second tie-rod 32 based on the rotational input as is generally known. It should be noted that while the system 10 includes the first tie-rod 30 and the second tie-rod 32, the performance of the steering system 22 can be determined without the use of the first tie-rod 30 and the second tie-rod 32, and thus, the first tie-rod 30 and the second tie-rod 32 are optional.

In the example of the steering system 22, the testing structure 12 includes a first fixture 34 coupled to a bedplate 36. The bedplate 36 is generally coupled to the first fixture 34 and to a floor of a workspace to secure the first fixture 34 against movement. It should be noted that the number of fixtures illustrated herein is merely exemplary, as any number of fixtures can be employed with the testing structure 12 to determine the performance of the steering system 22, including multiple fixtures.

The first fixture 34 supports at least the steering gear 28, and includes one or more couplings 42. The one or more couplings 42 are coupled to or about the steering gear 28 such that the steering gear 28 is fixed relative to the testing structure 12 in the same manner as the steering gear 28 would be coupled in a vehicle. Stated another way, the steering system 22 is coupled to the testing structure 12 in the same manner as the steering system 22 is coupled for use in a vehicle. Thus, the one or more couplings 42 are generally coupled to or about the steering gear 28 such that the first tie-rod 30 and second tie-rod 32 are movable relative to the steering gear 28. In one example, the one or more couplings 42 are fixed or static couplings that rigidly couple the steering gear 28 of the steering system 22 to the first fixture 34, however, the one or more couplings 42 can comprise slightly flexible or elastic couplings to couple the steering gear 28 to the first fixture 34.

The at least one load source 14 is responsive to one or more control signals from the diagnostic module 20 to apply a load to at least one of the tie rods 30, 32. In one example, the at least one load source 14 comprises a first load source 70 and a second load source 72. The first load source 70 can be responsive to the one or more control signals from the diagnostic module 20 to apply a load to the first tie-rod 30. The second load source 72 can be responsive to the one or more control signals to apply a load to the second tie-rod 32. While the first load source 70 and the second load source 72 are not illustrated herein as being coupled to a fixture of the testing structure 12, such as the first fixture 34, it will be understood that one or more of the first load source 70 and the second load source 72 can be coupled to one or more fixtures of the testing structure 12, if desired. Furthermore, while the first load source 70 and the second load source 72 are described and illustrated herein as applying a load to a respective one of the first tie-rod 30 and the second tie-rod 32, the first load source 70 and the second load source 72 can apply a load directly to a movable link of the steering gear 28, if desired.

In one example, the first load source 70 and the second load source 72 can comprise load cells, which can apply a load to the first tie-rod 30 and the second tie-rod 32 at a particular frequency. In one example, the first load source 70 and the second load source 72 each apply a first load at a first frequency to the respective one of the first tie-rod 30 and the second tie-rod 32, and apply a second load at a second frequency to the respective one of the first tie-rod 30 and the second tie-rod 32. Generally, the first load is different than the second load, and the first frequency is different than the second frequency. In one example, the first load is greater than the second load, and the first frequency is less than the second frequency. For example, the first load is about 1750 Newton (N), a maximum of the first load at the first frequency, and the second load is about 250 Newton (N), a maximum of the second load at the second frequency. The first frequency is about 0.1 Hertz (Hz) and the second frequency is about 15 Hertz (Hz). Thus, the first load source 70 and the second load source 72 are each capable of applying a low frequency load and a high frequency load to the respective ones of the first tie-rod 30 and the second tie-rod 32.

The angle input source 16 is responsive to one or more control signals from the diagnostic module 20 to apply a torque to the steering system 22. In one example, the angle input source 16 is coupled to the steering gear 28 to provide the torque or torsional input representative of a hand wheel angle input to the steering gear 28. Alternatively, the angle input source 16 can be coupled to a hand wheel, steering shaft or intermediate shaft associated with the steering system 22, and can apply the hand wheel angle input directly to one of the hand wheel, steering shaft or intermediate shaft. In one example, the angle input source 16 is a rotary actuator that rotates an input shaft 74 of the steering gear 28 between about −30 degrees and about 30 degrees relative to a longitudinal axis of the input shaft 74 at a frequency of about 0.1 Hertz (Hz). In one example, the angle input source 16 applies the torque to the steering system 22 that changes as a function of the first load applied by the first load source 70 such that a maximum value of the first load is applied to the steering system 22 at a maximum angle of the angle input source 16. The first load is generally applied in a direction of opposing the motion generated by the angle input source 16. Stated another way, the angle input source 16 rotates the input shaft 74 to a maximum angle (e.g. about −30 degrees, about 30 degrees) at the maximum load (e.g. +1750 N, −1750 N) for the first load applied by the first load source 70. It should be noted that this input to the input shaft 74 is merely exemplary, as any input could be applied to the input shaft 74 to simulate the steering of the vehicle during operation of the vehicle.

The at least one sensor 18 is coupled to the steering system 22. In one example, the at least one sensor 18 comprises a first force sensor 76, a second force sensor 82, a rotary sensor 84 and a torque sensor 86. The first force sensor 76, the second force sensor 82, the rotary sensor 84 and the torque sensor 86 are each in communication with the diagnostic module 20 over a suitable communication architecture or arrangement that facilitates transfer of data, commands, power, etc. In one example, the first force sensor 76 comprises a first force transducer. The first force sensor 76 measures and observes a force acting on the first tie-rod 30 and generates sensor signals based thereon. The second force sensor 82 comprises a second force transducer. The second force sensor 82 measures and observes a force acting on the second tie-rod 32 and generates sensor signals based thereon. The rotary sensor 84 comprises a rotary encoder. The rotary sensor 84 measures and observes a rotation of the input shaft 74 and generates sensor signals based thereon. It should be noted that the use of a rotary encoder for the rotary sensor 84 is merely exemplary. In this regard, the rotary sensor 82 can comprise any suitable device for measuring and observing a rotation of the input shaft 74, including, but not limited to, an analog potentiometer.

The torque sensor 86 is coupled to the input shaft 74. The torque sensor 86 comprises a torque sensor or torque transducer. The torque sensor 86 measures and observes a torque acting on the input shaft 74 and generates sensor signals based thereon. It should be noted that while the torque sensor 86 is illustrated herein as being associated with measuring and observing a torque on the input shaft 74, alternatively, the torque sensor 86 can measure and observe a torque on the steering shaft or intermediate shaft of the steering system 22 and generate sensor signals based thereon, for example. It should be noted that the use of a torque sensor or torque transducer coupled to the input shaft 74 as the torque sensor 86 is merely exemplary. In this regard, the torque sensor 86 can comprise any suitable device for measuring and observing a torque on the input shaft 74 of the steering system 22, including, but not limited to, an internal torque sensor associated with the steering system 22. Thus, the use of an externally mounted torque sensor is merely exemplary.

In various embodiments, with reference to FIG. 1, the diagnostic module 20 outputs one or more control signals to the first load source 70, the second load source 72 and the angle input source 16 of the system 10 based on input data from an input device 78. The diagnostic module 20 receives sensor signals from the first force sensor 76, the second force sensor 82, the rotary sensor 84 and the torque sensor 86 in response to the control signals. The diagnostic module 20 evaluates the sensor signals to determine a performance of the steering system 22. The diagnostic module 20 generates data indicating the performance of the steering system 22. The data includes display data for displaying the performance of the steering system 22 via a display 80. The diagnostic module 20 also stores the data indicating the performance of the steering system 22 in a datastore. In one example, the diagnostic module 20 is coupled to or in communication with the display 80.

The display 80 displays data for the operator of the test, and can display performance data associated with the steering system 22. The display 80 can be implemented as a flat panel display coupled to the testing structure 12, but can also comprise a hand held device or portable electronic device in communication with the diagnostic module 20. The display 80 comprises any suitable technology for displaying information, including, but not limited to, a liquid crystal display (LCD), organic light emitting diode (OLED), plasma, or a cathode ray tube (CRT). The display 80 can also include the input device 78, if desired. The display 80 and input device 78 are in communication with the diagnostic module 20 over a suitable communication architecture or arrangement that facilitates transfer of data, commands, power, etc.

In various embodiments, the diagnostic module 20 generates the control signals based on user input received from an operator. An input device 78 is manipulable by an operator of the system 10 to generate user input. In various embodiments, the user input can include a command to start or stop the testing of the steering system 22, as will be discussed herein. The input device 78 can be implemented as a keyboard (not separately shown), a microphone (not separately shown), a touchscreen layer associated with or as part of the display 80, or other suitable device to receive data and/or commands from the user. Of course, multiple input devices 78 can also be utilized. It should be noted that the input device 78, the display 80 and the diagnostic module 20 can be implemented in various ways, and can comprise a handheld or stationary computing system, which can be in communication with the first load source 70, the second load source 72, the angle input source 16, the first force sensor 76, the second force sensor 82, the rotary sensor 84 and the torque sensor 86 over a suitable architecture or arrangement that facilitates the transfer of data, commands, power, etc.

Figure 2:
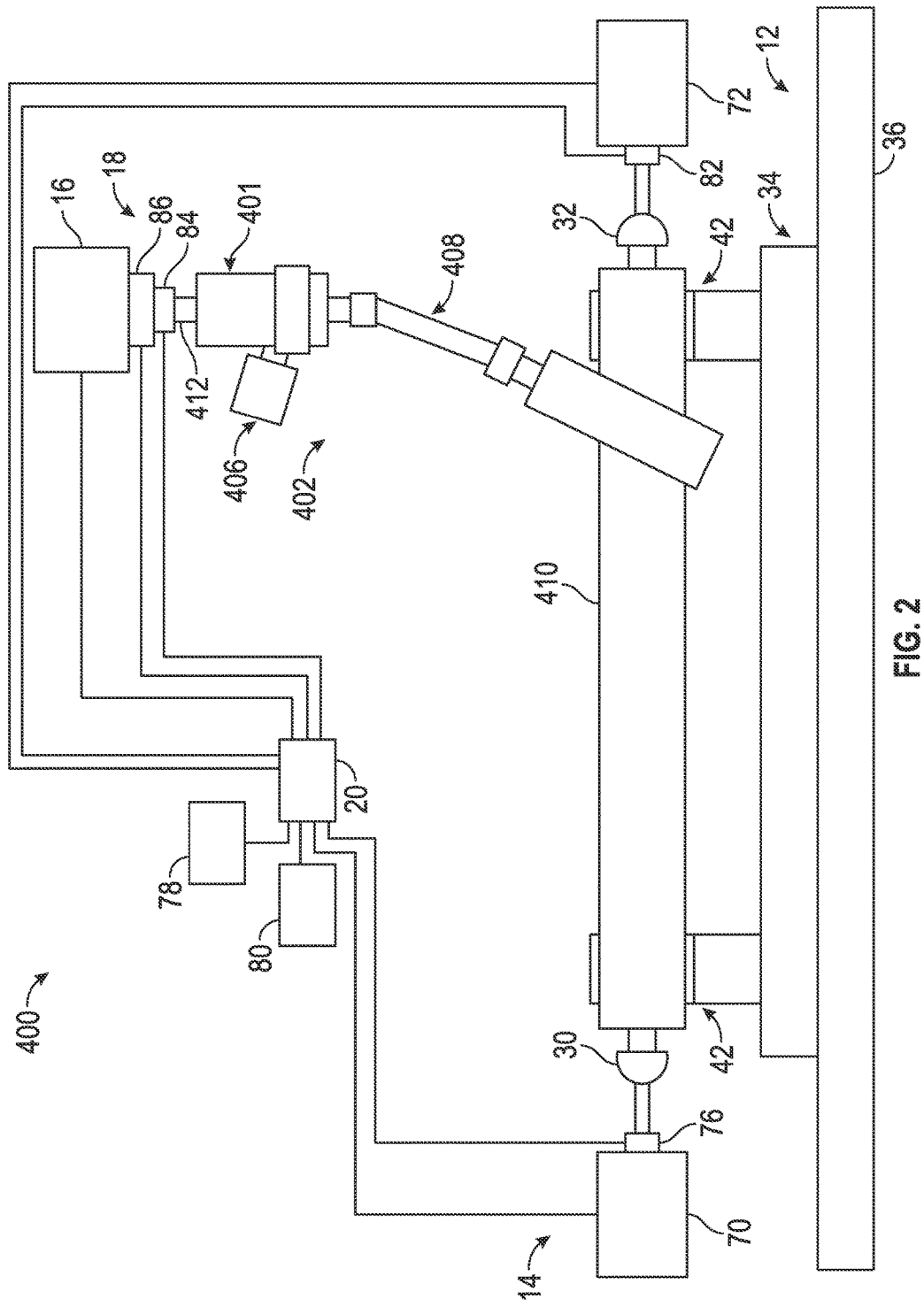
FIG. 2 is a schematic illustration of a system for determining steering performance of a steering gear in accordance with various embodiments.

With reference now to FIG. 2, a system 400 for determining steering performance is shown. As the system 400 can be similar to the system 10 discussed with regard to FIG. 1, only the differences between the system 10 and the system 400 will be discussed in detail herein, with the same reference numerals used to denote the same or substantially similar components. With reference to FIG. 2, the system 400 includes the testing structure 12, the at least one load source 14, the angle input source 16, the at least one sensor 18 and the diagnostic module 20 in accordance with various embodiments. As will be discussed further herein, the system 400 enables the determination of a performance of a steering system 402 coupled to the testing structure 12. Although the figures shown herein depict an example with certain arrangements of elements, additional intervening elements, devices, features, or components may be present in an actual embodiment. It should also be understood that FIG. 2 is merely illustrative and may not be drawn to scale.

The testing structure 12 supports the steering system 402 and can support one or more of the at least one load source 14, the angle input source 16, the at least one sensor 18 and the diagnostic module 20. In one example, the steering system 402 is a steering system for use with a vehicle. The vehicle may be an automobile, an aircraft, a spacecraft, a watercraft, a sport utility vehicle, or any other type of vehicle. For exemplary purposes the disclosure will be discussed in the context of the steering system 402 being used with an automobile. In the example of FIG. 2, the steering system 402 is a column based electric power steering system.

As a steering system 402 for an automobile can be generally known, the steering system 402 will not be discussed in great detail herein. Briefly, however, in this example, the steering system 402 includes a steering column 401, a steering assist unit 406, an intermediate shaft 408, a manual steering rack and pinion assembly 410, the first tie-rod 30 and the second tie-rod 32. The steering column 401 receives rotational input from the angle input source 16, and transfers the rotational input into input for the intermediate shaft 408 with the steering assist unit 406 providing assist. The intermediate shaft 408 is coupled to the manual steering gear 410 and transfers the rotational input from the steering column 401 to the manual steering gear 410. The manual steering gear 410, through a suitable gearing, converts the rotational input into translational input to the first tie-rod 30 and the second tie-rod 32 as is generally known. It should be noted that while the system 400 includes the first tie-rod 30 and the second tie-rod 32, the performance of the steering system 402 can be determined without the use of the first tie-rod 30 and the second tie-rod 32, and thus, the first tie-rod 30 and the second tie-rod 32 are optional.

In the example of the steering system 402, the testing structure 12 includes the first fixture 34 coupled to the bedplate 36. The first fixture 34 supports at least the manual steering gear 410, and includes the one or more couplings 42. The one or more couplings 42 are coupled to or about the manual steering gear 410 such that the steering system 402 is fixed relative to the testing structure 12 in the same manner as the steering system 402 would be coupled to a vehicle.

The at least one load source 14 is responsive to one or more control signals from the diagnostic module 20 to apply a load to at least one of the tie rods 30, 32 via a respective one of the first load source 70 and the second load source 72. The first load source 70 can be responsive to the one or more control signals from the diagnostic module 20 to apply a load to the first tie-rod 30. The second load source 72 can be responsive to the one or more control signals to apply a load to the second tie-rod 32. In one example, the first load source 70 and the second load source 72 each apply a first load at a first frequency to the respective one of the first tie-rod 30 and the second tie-rod 32, and apply a second load at a second frequency to the respective one of the first tie-rod 30 and the second tie-rod 32. Generally, the first load is different than the second load, and the first frequency is different than the second frequency. In one example, the first load is greater than the second load, and the first frequency is less than the second frequency. For example, the first load is about 1750 Newton (N), a maximum of the first load at the first frequency, and the second load is about 250 Newton (N), a maximum of the second load at the second frequency. The first frequency is about 0.1 Hertz (Hz) and the second frequency is about 15 Hertz (Hz). Thus, the first load source 70 and the second load source 72 are each capable of applying a low frequency load and a high frequency load to the respective ones of the first tie-rod 30 and the second tie-rod 32.

The angle input source 16 is responsive to one or more control signals from the diagnostic module 20 to apply a torque to the steering column 401. In one example, the angle input source 16 is coupled to the steering column 401 to provide the torque or torsional input representative of a hand wheel angle input to the steering column 401. Alternatively, the angle input source 16 can be coupled to a hand wheel or steering shaft associated with the steering system 402, and can apply the hand wheel angle input directly to one of the hand wheel or steering shaft. In one example, the angle input source 16 is a rotary actuator that rotates an input shaft 412 of the steering column 401 between about −30 degrees and about 30 degrees relative to a longitudinal axis of the input shaft 412 at a frequency of about 0.1 Hertz (Hz). In one example, the angle input source 16 applies the torque to the steering system 402 that changes as a function of the first load applied by the first load source 70 such that a maximum value of the first load is applied to the steering system 402 at a maximum angle of the angle input source 16. The first load is generally applied in a direction of opposing the motion generated by the angle input source 16. Stated another way, the angle input source 16 rotates the input shaft 412 to a maximum angle (e.g. about −30 degrees, about 30 degrees) at the maximum load (e.g. +1750 N, −1750 N) for the first load applied by the first load source 70. It should be noted that this input to the input shaft 412 is merely exemplary, as any input could be applied to the input shaft 412 to simulate the steering of the vehicle during operation of the vehicle.

The at least one sensor 18 is coupled to the steering system 402. In one example, the at least one sensor 18 comprises the first force sensor 76, the second force sensor 82, the rotary sensor 84 and the torque sensor 86. The first force sensor 76, the second force sensor 82, the rotary sensor 84 and the torque sensor 86 are each in communication with the diagnostic module 20 over a suitable communication architecture or arrangement that facilitates transfer of data, commands, power, etc. In one example, the first force sensor 76 comprises a first force transducer. The first force sensor 76 measures and observes a force acting on the first tie-rod 30 and generates sensor signals based thereon. The second force sensor 82 comprises a second force transducer. The second force sensor 82 measures and observes a force acting on the second tie-rod 32 and generates sensor signals based thereon. The rotary sensor 84 comprises a rotary encoder. The rotary sensor 84 measures and observes a rotation of the input shaft 412 and generates sensor signals based thereon. It should be noted that the use of a rotary encoder for the rotary sensor 84 is merely exemplary. In this regard, the rotary sensor 82 can comprise any suitable device for measuring and observing a rotation of the input shaft 412, including, but not limited to, an analog potentiometer.

The torque sensor 86 is coupled to the input shaft 412. The torque sensor 86 comprises a torque sensor or torque transducer. The torque sensor 86 measures and observes a torque acting on the input shaft 412 and generates sensor signals based thereon. It should be noted that while the torque sensor 86 is illustrated herein as being associated with measuring and observing a torque on the input shaft 412, alternatively, the torque sensor 86 can measure and observe a torque on the steering shaft or intermediate shaft of the steering system 402 and generate sensor signals based thereon, for example. It should be noted that the use of a torque sensor or torque transducer coupled to the input shaft 412 as the torque sensor 86 is merely exemplary. In this regard, the torque sensor 86 can comprise any suitable device for measuring and observing a torque on the input shaft 412 of the steering system 604, including, but not limited to, an internal torque sensor associated with the steering system 402, such as an internal torque sensor associated with the steering assist unit 406. Thus, the use of an externally mounted torque sensor is merely exemplary.

In various embodiments, with reference to FIG. 2, the diagnostic module 20 outputs one or more control signals to the first load source 70, the second load source 72 and the angle input source 16 of the system 400 based on input data from an input device 78. The diagnostic module 20 receives sensor signals from the first force sensor 76, the second force sensor 82, the rotary sensor 84 and the torque sensor 86 in response to the control signals. The diagnostic module 20 evaluates the sensor signals to determine a performance of the steering system 402. The diagnostic module 20 generates data indicating the performance of the steering system 402. The data includes display data for displaying the performance of the steering system 402 via a display 80. The diagnostic module 20 also stores the data indicating the performance of the steering system 402 in a datastore. As discussed with regard to FIG. 1, the diagnostic module 20 is coupled to or in communication with the display 80 and the input device 78 over a suitable communication architecture or arrangement that facilitates transfer of data, commands, power, etc.

Figure 3:
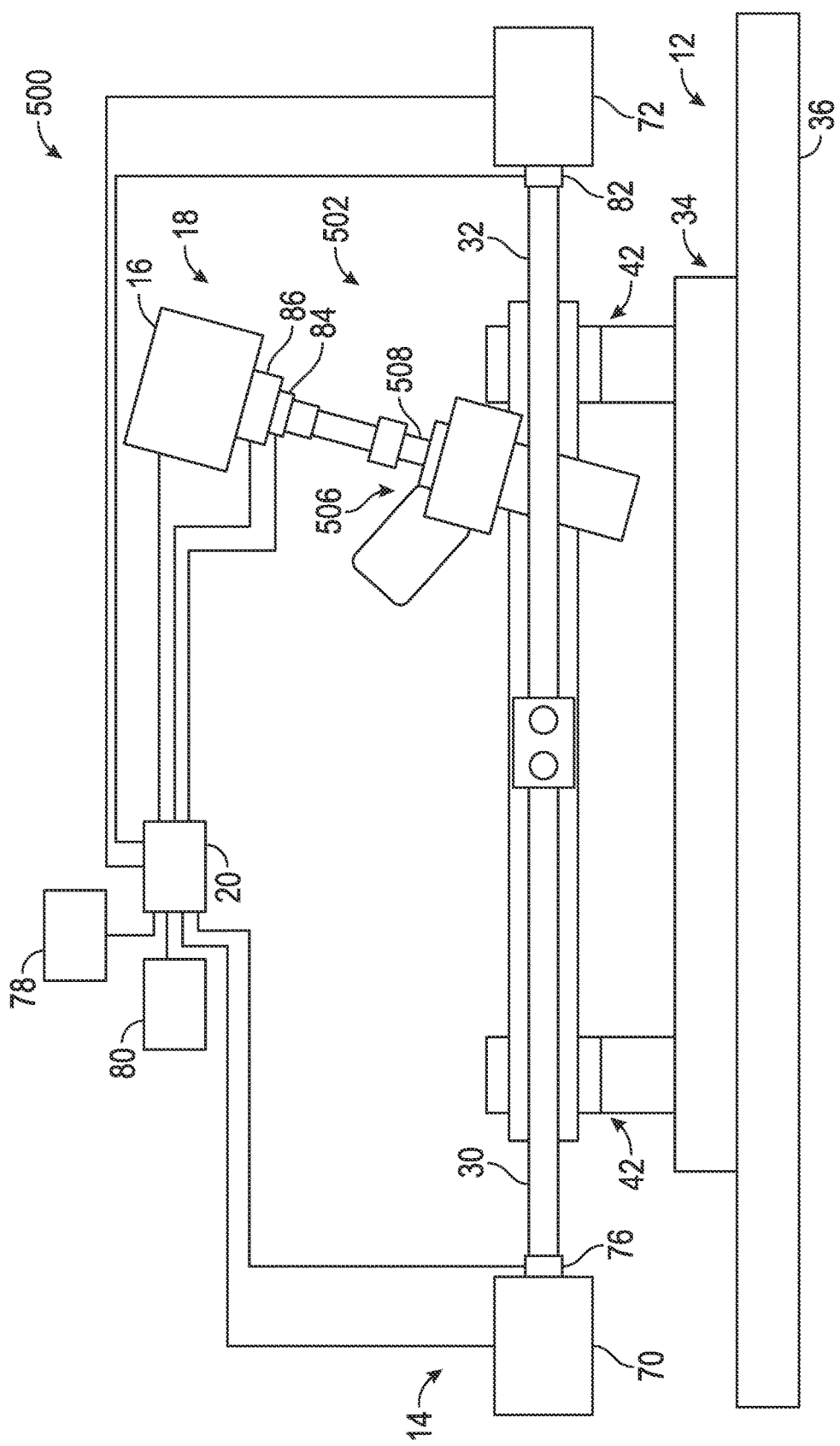
FIG. 3 is a schematic illustration of a system for determining steering performance of a steering gear in accordance with various embodiments.

With reference now to FIG. 3, a system 500 for determining steering performance is shown. As the system 500 can be similar to the system 10 discussed with regard to FIG. 1, only the differences between the system 10 and the system 500 will be discussed in detail herein, with the same reference numerals used to denote the same or substantially similar components. With reference to FIG. 3, the system 500 includes the testing structure 12, the at least one load source 14, the angle input source 16, the at least one sensor 18 and the diagnostic module 20 in accordance with various embodiments. As will be discussed further herein, the system 500 enables the determination of a performance of a steering system 502 coupled to the testing structure 12. Although the figures shown herein depict an example with certain arrangements of elements, additional intervening elements, devices, features, or components may be present in an actual embodiment. It should also be understood that FIG. 3 is merely illustrative and may not be drawn to scale.

The testing structure 12 supports the steering system 502 and can support one or more of the at least one load source 14, the angle input source 16, the at least one sensor 18 and the diagnostic module 20. In one example, the steering system 502 is a steering system for use with a vehicle. The vehicle may be an automobile, an aircraft, a spacecraft, a watercraft, a sport utility vehicle, or any other type of vehicle. For exemplary purposes the disclosure will be discussed in the context of the steering system 502 being used with an automobile. In the example of FIG. 3, the steering system 502 is a center take-off based electric power steering system.

As a steering system 502 for an automobile can be generally known, the steering system 502 will not be discussed in great detail herein. Briefly, however, in this example, the steering system 502 includes a steering assist unit 506, the first tie-rod 30 and the second tie-rod 32. The steering assist unit 506 receives rotational input from the angle input source 16, and through a suitable gearing, converts the rotational input into translational input for the first tie-rod 30 and the second tie-rod 32 as is generally known. It should be noted that while the system 500 includes the first tie-rod 30 and the second tie-rod 32, the performance of the steering system 502 can be determined without the use of the first tie-rod 30 and the second tie-rod 32, and thus, the first tie-rod 30 and the second tie-rod 32 are optional.

In the example of the steering system 502, the testing structure 12 includes the first fixture 34 coupled to the bedplate 36. The first fixture 34 supports at least the steering gear 506, and includes the one or more couplings 42. The one or more couplings 42 are coupled to or about the steering assist unit 506 such that the steering system 502 is fixed relative to the testing structure 12 in the same manner as the steering system 502 would be coupled to a vehicle.

The at least one load source 14 is responsive to one or more control signals from the diagnostic module 20 to apply a load to at least one of the tie rods 30, 32 via a respective one of the first load source 70 and the second load source 72. The first load source 70 can be responsive to the one or more control signals from the diagnostic module 20 to apply a load to the first tie-rod 30. The second load source 72 can be responsive to the one or more control signals to apply a load to the second tie-rod 32. In one example, the first load source 70 and the second load source 72 each apply a first load at a first frequency to the respective one of the first tie-rod 30 and the second tie-rod 32, and apply a second load at a second frequency to the respective one of the first tie-rod 30 and the second tie-rod 32. Generally, the first load is different than the second load, and the first frequency is different than the second frequency. In one example, the first load is greater than the second load, and the first frequency is less than the second frequency. For example, the first load is about 1750 Newton (N), a maximum of the first load at the first frequency, and the second load is about 250 Newton (N), a maximum of the second load at the second frequency. The first frequency is about 0.1 Hertz (Hz) and the second frequency is about 15 Hertz (Hz). Thus, the first load source 70 and the second load source 72 are each capable of applying a low frequency load and a high frequency load to the respective ones of the first tie-rod 30 and the second tie-rod 32.

The angle input source 16 is responsive to one or more control signals from the diagnostic module 20 to apply a torque to the steering assist unit 506. In one example, the angle input source 16 is coupled to the steering assist unit 506 to provide the torque or torsional input representative of a hand wheel angle input to the steering assist unit 506. Alternatively, the angle input source 16 can be coupled to a hand wheel or steering shaft associated with the steering system 502, and can apply the hand wheel angle input directly to one of the hand wheel or steering shaft. In one example, the angle input source 16 is a rotary actuator that rotates an input shaft 508 of the steering assist unit 506 between about −30 degrees and about 30 degrees relative to a longitudinal axis of the input shaft 508 at a frequency of about 0.1 Hertz (Hz). In one example, the angle input source 16 applies the torque to the steering system 502 that changes as a function of the first load applied by the first load source 70 such that a maximum value of the first load is applied to the steering system 502 at a maximum angle of the angle input source 16. The first load is generally applied in a direction of opposing the motion generated by the angle input source 16. Stated another way, the angle input source 16 rotates the input shaft 508 to a maximum angle (e.g. about −30 degrees, about 30 degrees) at the maximum load (e.g. +1750 N, −1750 N) for the first load applied by the first load source 70. It should be noted that this input to the input shaft 508 is merely exemplary, as any input could be applied to the input shaft 508 to simulate the steering of the vehicle during operation of the vehicle.

The at least one sensor 18 is coupled to the steering system 502. In one example, the at least one sensor 18 comprises the first force sensor 76, the second force sensor 82, the rotary sensor 84 and the torque sensor 86. The first force sensor 76, the second force sensor 82, the rotary sensor 84 and the torque sensor 86 are each in communication with the diagnostic module 20 over a suitable communication architecture or arrangement that facilitates transfer of data, commands, power, etc. In one example, the first force sensor 76 comprises a first force transducer. The first force sensor 76 measures and observes a force acting on the first tie-rod 30 and generates sensor signals based thereon. The second force sensor 82 comprises a second force transducer. The second force sensor 82 measures and observes a force acting on the second tie-rod 32 and generates sensor signals based thereon. The rotary sensor 84 comprises a rotary encoder. The rotary sensor 84 measures and observes a rotation of the input shaft 508 and generates sensor signals based thereon. It should be noted that the use of a rotary encoder for the rotary sensor 84 is merely exemplary. In this regard, the rotary sensor 82 can comprise any suitable device for measuring and observing a rotation of the input shaft 508, including, but not limited to, an analog potentiometer.

The torque sensor 86 is coupled to the input shaft 508. The torque sensor 86 comprises a torque sensor or torque transducer. The torque sensor 86 measures and observes a torque acting on the input shaft 508 and generates sensor signals based thereon. It should be noted that while the torque sensor 86 is illustrated herein as being associated with measuring and observing a torque on the input shaft 508, alternatively, the torque sensor 86 can measure and observe a torque on the steering shaft or intermediate shaft of the steering system 502 and generate sensor signals based thereon, for example. It should be noted that the use of a torque sensor or torque transducer coupled to the input shaft 508 as the torque sensor 86 is merely exemplary. In this regard, the torque sensor 86 can comprise any suitable device for measuring and observing a torque on the input shaft 508 of the steering system 502, including, but not limited to, an internal torque sensor associated with the steering system 502, such as an internal torque sensor associated with the steering assist unit 506. Thus, the use of an externally mounted torque sensor is merely exemplary.

In various embodiments, with reference to FIG. 3, the diagnostic module 20 outputs one or more control signals to the first load source 70, the second load source 72 and the angle input source 16 of the system 500 based on input data from an input device 78. The diagnostic module 20 receives sensor signals from the first force sensor 76, the second force sensor 82, the rotary sensor 84 and the torque sensor 86 in response to the control signals. The diagnostic module 20 evaluates the sensor signals to determine a performance of the steering system 502. The diagnostic module 20 generates data indicating the performance of the steering system 502. The data includes display data for displaying the performance of the steering system 502 via a display 80. The diagnostic module 20 also stores the data indicating the performance of the steering system 502 in a datastore. As discussed with regard to FIG. 1, the diagnostic module 20 is coupled to or in communication with the display 80 and the input device 78 over a suitable communication architecture or arrangement that facilitates transfer of data, commands, power, etc.

Figure 4:
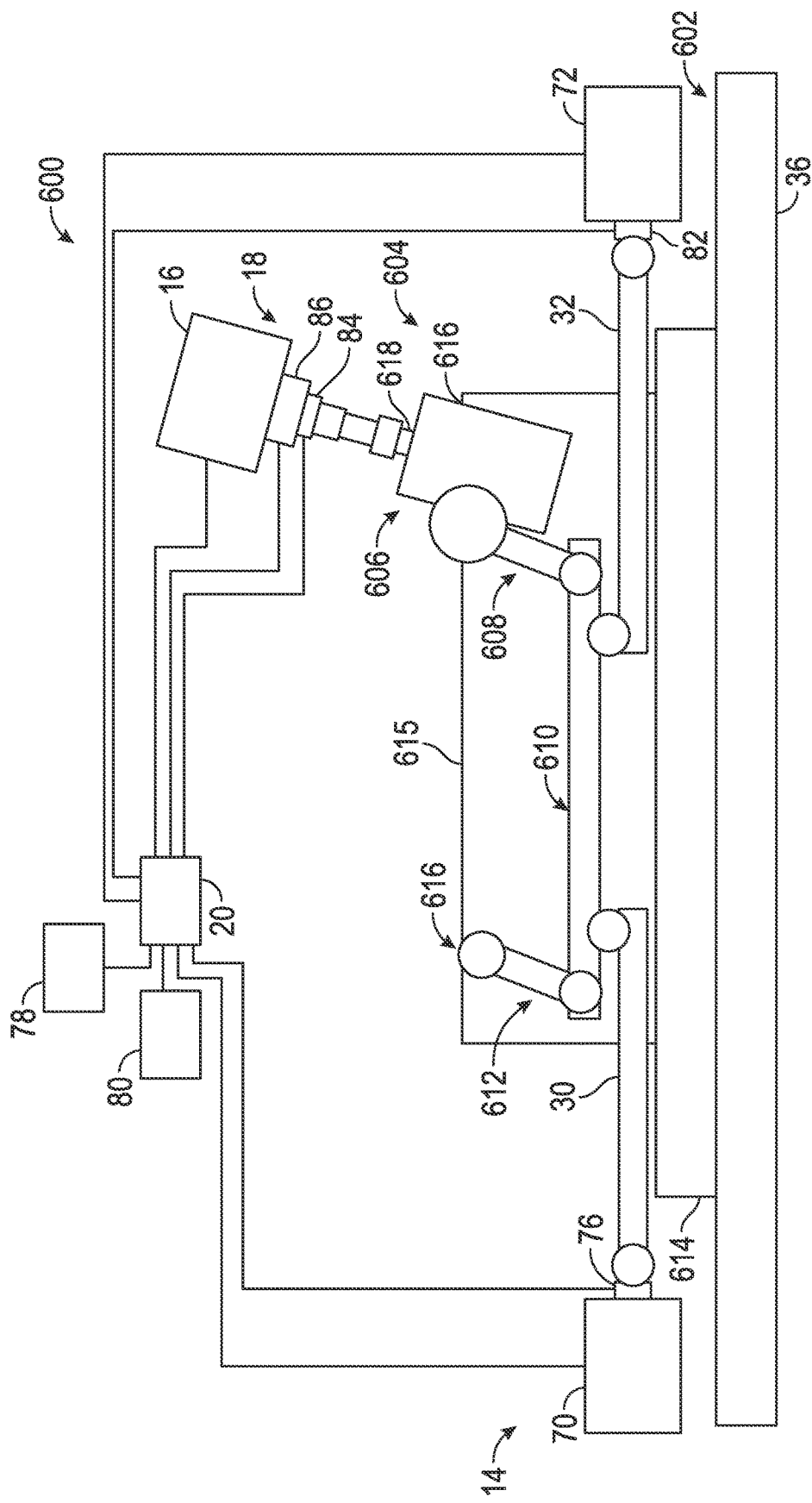
FIG. 4 is a schematic illustration of a system for determining steering performance of a steering gear in accordance with various embodiments.

With reference now to FIG. 4, a system 600 for determining steering performance is shown is shown. As the system 600 can be similar to the system 10 discussed with regard to FIG. 1, only the differences between the system 10 and the system 600 will be discussed in detail herein, with the same reference numerals used to denote the same or substantially similar components. With reference to FIG. 4, the system 600 includes a testing structure 602, the at least one load source 14, the angle input source 16, the at least one sensor 18 and the diagnostic module 20 in accordance with various embodiments. As will be discussed further herein, the system 600 enables the determination of a performance of a steering system 604 coupled to the testing structure 602. Although the figures shown herein depict an example with certain arrangements of elements, additional intervening elements, devices, features, or components may be present in an actual embodiment. It should also be understood that FIG. 4 is merely illustrative and may not be drawn to scale.

The testing structure 602 supports the steering system 604 and can support one or more of the at least one load source 14, the angle input source 16, the at least one sensor 18 and the diagnostic module 20. In one example, the steering system 604 is a steering system for use with a vehicle. The vehicle may be an automobile, an aircraft, a spacecraft, a watercraft, a sport utility vehicle, or any other type of vehicle. For exemplary purposes the disclosure will be discussed in the context of the steering system 604 being used with an automobile. In the example of FIG. 4, the steering system 604 is a recirculating ball or integral steering system. The steering system 604 can be a hydraulic based system or an electric power system as known to those skilled in the art.

As a steering system 604 for an automobile can be generally known, the steering system 604 will not be discussed in great detail herein. Briefly, however, in this example, the steering system 604 includes a steering assist unit 606, a pitman arm 608, a relay rod 610, an idler arm 612, the first tie-rod 30 and the second tie-rod 32. The steering assist unit 606 receives rotational input from the angle input source 16, and through a suitable gearing, converts the rotational input into input for the pitman arm 608. The pitman arm 608 transfers the input through the relay rod 610 to the first tie-rod 30 and the second tie-rod 32 as is generally known. It should be noted that while the system 600 includes the first tie-rod 30 and the second tie-rod 32, the performance of the steering system 604 can be determined without the use of the first tie-rod 30 and the second tie-rod 32, and thus, the first tie-rod 30 and the second tie-rod 32 are optional.

In the example of the steering system 604, the testing structure 602 includes a first fixture 614 coupled to the bedplate 36 and a second fixture 615 coupled to the first fixture 614. It should be noted that the second fixture 615 can be coupled to the bedplate 36, if desired. The first fixture 614 supports at least the steering assist unit 606, and the second fixture 615 includes one or more couplings 616. The one or more couplings 616 are coupled to the idler arm 612 and the steering assist unit 606 such that the steering system 604 is fixed relative to the testing structure 602 in the same manner as the steering system 604 would be coupled to a vehicle. In one example, the steering assist unit 606 is substantially rigidly coupled to the second fixture 615, and the idler arm 612 is coupled to the second fixture 615 so as to have one degree of rotational freedom relative to the second fixture 615.

The at least one load source 14 is responsive to one or more control signals from the diagnostic module 20 to apply a load to at least one of the tie rods 30, 32 via a respective one of the first load source 70 and the second load source 72. The first load source 70 can be responsive to the one or more control signals from the diagnostic module 20 to apply a load to the first tie-rod 30. The second load source 72 can be responsive to the one or more control signals to apply a load to the second tie-rod 32. In one example, the first load source 70 and the second load source 72 each apply a first load at a first frequency to the respective one of the first tie-rod 30 and the second tie-rod 32, and apply a second load at a second frequency to the respective one of the first tie-rod 30 and the second tie-rod 32. Generally, the first load is different than the second load, and the first frequency is different than the second frequency. In one example, the first load is greater than the second load, and the first frequency is less than the second frequency. For example, the first load is about 1750 Newton (N), a maximum of the first load at the first frequency, and the second load is about 250 Newton (N), a maximum of the second load at the second frequency. The first frequency is about 0.1 Hertz (Hz) and the second frequency is about 15 Hertz (Hz). Thus, the first load source 70 and the second load source 72 are each capable of applying a low frequency load and a high frequency load to the respective ones of the first tie-rod 30 and the second tie-rod 32.

The angle input source 16 is responsive to one or more control signals from the diagnostic module 20 to apply a torque to the steering assist unit 606. In one example, the angle input source 16 is coupled to the steering assist unit 606 to provide the torque or torsional input representative of a hand wheel angle input to the steering assist unit 606. Alternatively, the angle input source 16 can be coupled to a hand wheel or steering shaft associated with the steering system 604, and can apply the hand wheel angle input directly to one of the hand wheel or steering shaft. In one example, the angle input source 16 is a rotary actuator that rotates an input shaft 618 of the steering assist unit 606 between about −30 degrees and about 30 degrees relative to a longitudinal axis of the input shaft 618 at a frequency of about 0.1 Hertz (Hz). In one example, the angle input source 16 applies the torque to the steering system 604 that changes as a function of the first load applied by the first load source 70 such that a maximum value of the first load is applied to the steering system 604 at a maximum angle of the angle input source 16. The first load is generally applied in a direction of opposing the motion generated by the angle input source 16. Stated another way, the angle input source 16 rotates the input shaft 618 to a maximum angle (e.g. about −30 degrees, about 30 degrees) at the maximum load (e.g. +1750 N, −1750 N) for the first load applied by the first load source 70. It should be noted that this input to the input shaft 618 is merely exemplary, as any input could be applied to the input shaft 618 to simulate the steering of the vehicle during operation of the vehicle.

The at least one sensor 18 is coupled to the steering system 604. In one example, the at least one sensor 18 comprises the first force sensor 76, the second force sensor 82, the rotary sensor 84 and the torque sensor 86. The first force sensor 76, the second force sensor 82, the rotary sensor 84 and the torque sensor 86 are each in communication with the diagnostic module 20 over a suitable communication architecture or arrangement that facilitates transfer of data, commands, power, etc. In one example, the first force sensor 76 comprises a first force transducer. The first force sensor 76 measures and observes a force acting on the first tie-rod 30 and generates sensor signals based thereon. The second force sensor 82 comprises a second force transducer. The second force sensor 82 measures and observes a force acting on the second tie-rod 32 and generates sensor signals based thereon. The rotary sensor 84 comprises a rotary encoder. The rotary sensor 84 measures and observes a rotation of the input shaft 618 and generates sensor signals based thereon. It should be noted that the use of a rotary encoder for the rotary sensor 84 is merely exemplary. In this regard, the rotary sensor 82 can comprise any suitable device for measuring and observing a rotation of the input shaft 618, including, but not limited to, an analog potentiometer.

The torque sensor 86 is coupled to the input shaft 618. The torque sensor 86 comprises a torque sensor or torque transducer. The torque sensor 86 measures and observes a torque acting on the input shaft 618 and generates sensor signals based thereon. It should be noted that while the torque sensor 86 is illustrated herein as being associated with measuring and observing a torque on the input shaft 618, alternatively, the torque sensor 86 can measure and observe a torque on the steering shaft or intermediate shaft of the steering system 604 and generate sensor signals based thereon, for example. It should be noted that the use of a torque sensor or torque transducer coupled to the input shaft 618 as the torque sensor 86 is merely exemplary. In this regard, the torque sensor 86 can comprise any suitable device for measuring and observing a torque on the input shaft 618 of the steering system 604, including, but not limited to, an internal torque sensor associated with the steering system 604, such as an internal torque sensor associated with the steering assist unit 606. Thus, the use of an externally mounted torque sensor is merely exemplary.

In various embodiments, with reference to FIG. 4, the diagnostic module 20 outputs one or more control signals to the first load source 70, the second load source 72 and the angle input source 16 of the system 600 based on input data from an input device 78. The diagnostic module 20 receives sensor signals from the first force sensor 76, the second force sensor 82, the rotary sensor 84 and the torque sensor 86 in response to the control signals. The diagnostic module 20 evaluates the sensor signals to determine a performance of the steering system 604. The diagnostic module 20 generates data indicating the performance of the steering system 604. The data includes display data for displaying the performance of the steering system 604 via a display 80. The diagnostic module 20 also stores the data indicating the performance of the steering system 604 in a datastore. As discussed with regard to FIG. 1, the diagnostic module 20 is coupled to or in communication with the display 80 and the input device 78 over a suitable communication architecture or arrangement that facilitates transfer of data, commands, power, etc.

It should be noted that the steering systems 22, 402, 502, 604 discussed with FIGS. 1-4 are merely exemplary, and the systems and methods of determining steering system performance described herein can be applied to any applicable steering system, and thus, the testing structures 12, 602 illustrated herein are merely exemplary. For example, the various teachings of the present disclosure can be applied to determine the performance of a hydraulic power steering system (HPS), a dual pinion steering system, a rack concentric steering system, a pinion electric power steering system, etc.

Figure 5:
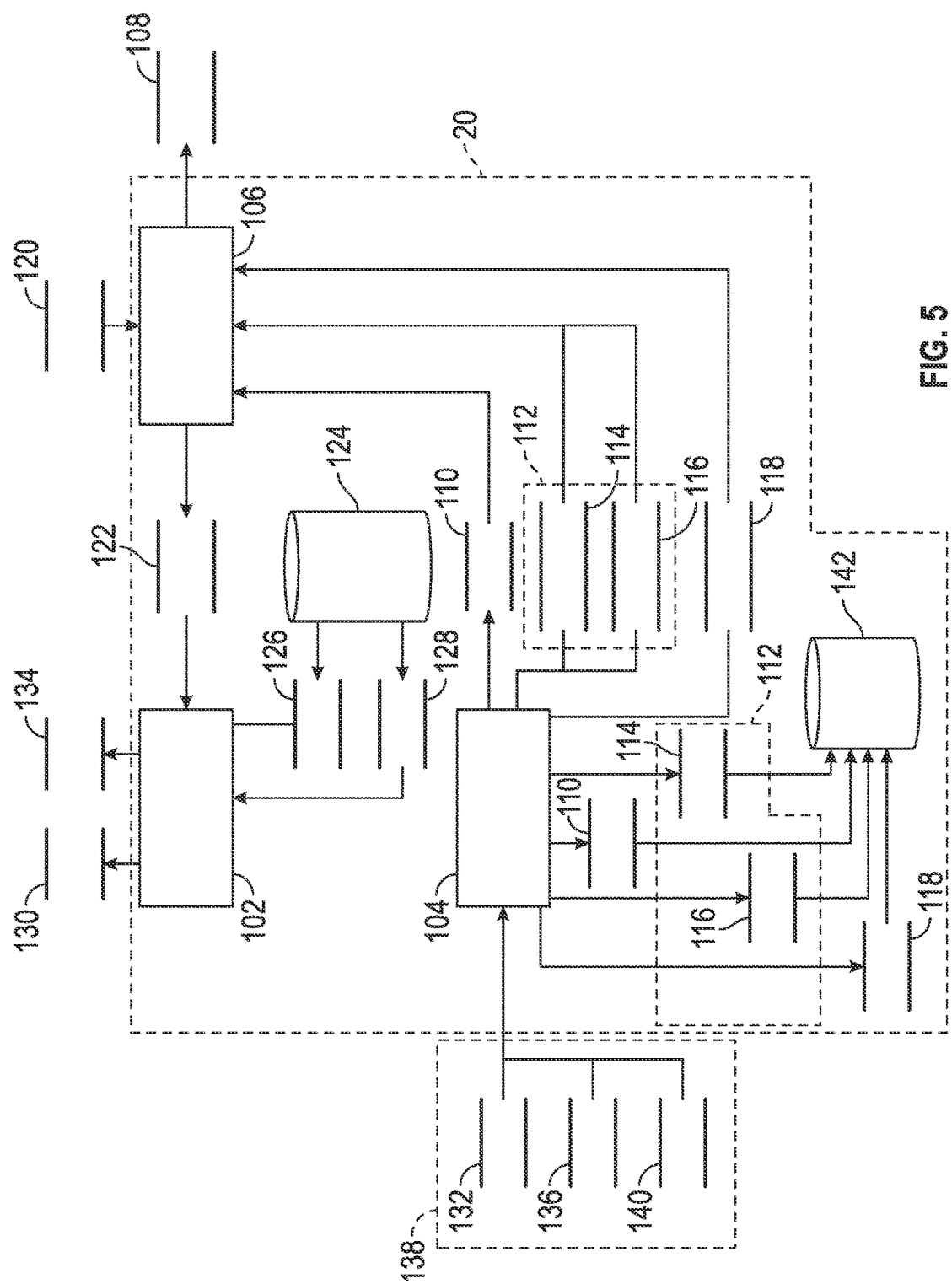
FIG. 5 is a dataflow diagram illustrating a control system of the system of FIGS. 1-4 in accordance with various embodiments.

Referring now to FIG. 5, and with continued reference to FIGS. 1-4, a dataflow diagram illustrates various embodiments of the diagnostic module 20. Various embodiments of the diagnostic module 20 according to the present disclosure can include any number of sub-modules embedded within the diagnostic module 20. As can be appreciated, the sub-modules shown in FIG. 5 can be combined and/or further partitioned to similarly control the first load source 70, the second load source 72 and the angle input source 16, and to output the performance data. Inputs to the system can be received from the at least one sensor 18 (FIGS. 1-4), received from one or more of the input devices 78 of the testing structure 12, 602, received from other control modules (not shown), and/or determined/modeled by other sub-modules (not shown) within the diagnostic module 20. In various embodiments, the diagnostic module 20 includes a test control module 102, an evaluation module 104 and a user interface (UI) control module 106.

The UI control module 106 generates user interface data 108 that may be used by the display 80 to display a chart 200 (FIG. 6) on a suitable user interface that may include data regarding the performance of the steering system 22, 402, 502, 604. In one example, the UI control module 106 generates the user interface data 108 based on performance data 110 and test performance data 112 received as input from the evaluation module 104. As will be discussed in greater detail below, the performance data 110 comprises filtered data that indicates the performance of the steering system 22, 402, 502, 604 based on the sensor data 138, as generated by the evaluation module 104, for display on the chart 200. As will be discussed further herein, the test performance data 112 comprises filtered data received from the evaluation module 104 that provides an indication that the test is operating normally. In one example, the test performance data 112 comprises load performance data 114 and angle performance data 116. The load performance data 114 comprises filtered data regarding a load applied by the first load source 70 and the second load source 72, and the angle performance data 116 comprises filtered data regarding an angle input applied to the input shaft 74, 412, 508, 618 by the angle input source 16.

Figure 6:
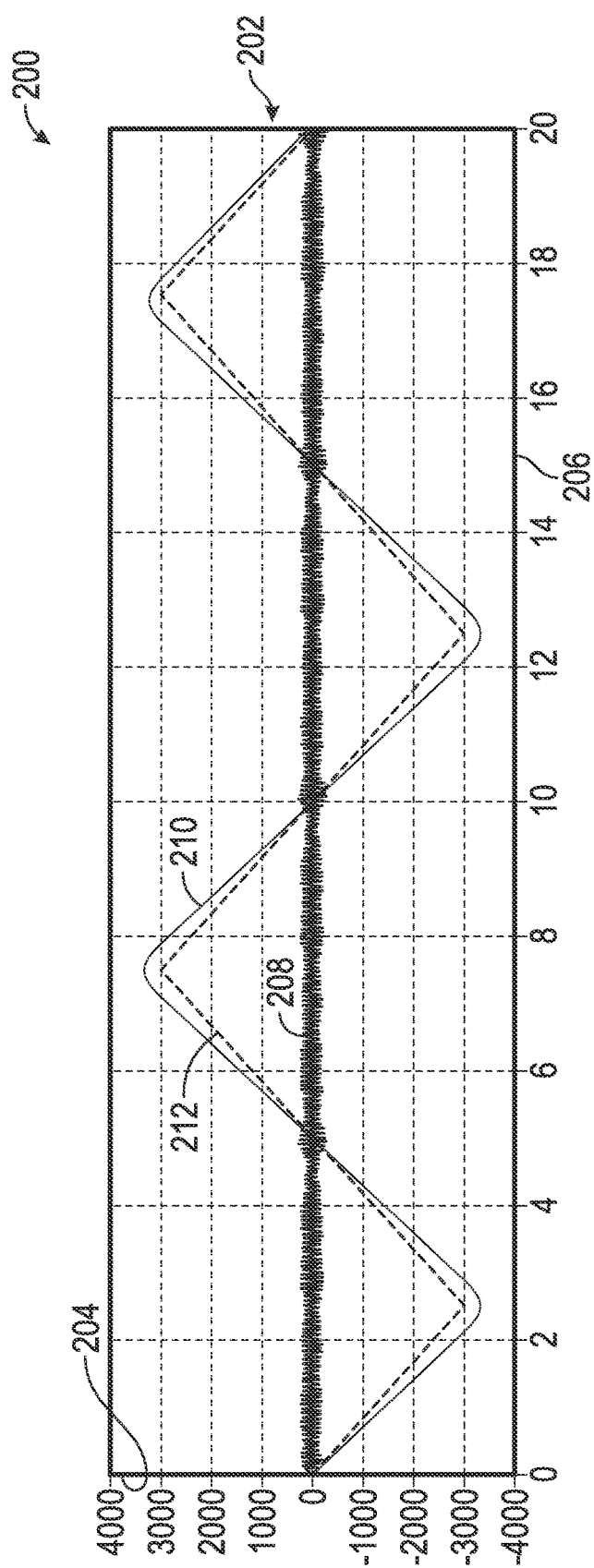
FIG. 6 is an exemplary chart generated by the control system of FIG. 5 in accordance with various embodiments.
Figure 7:
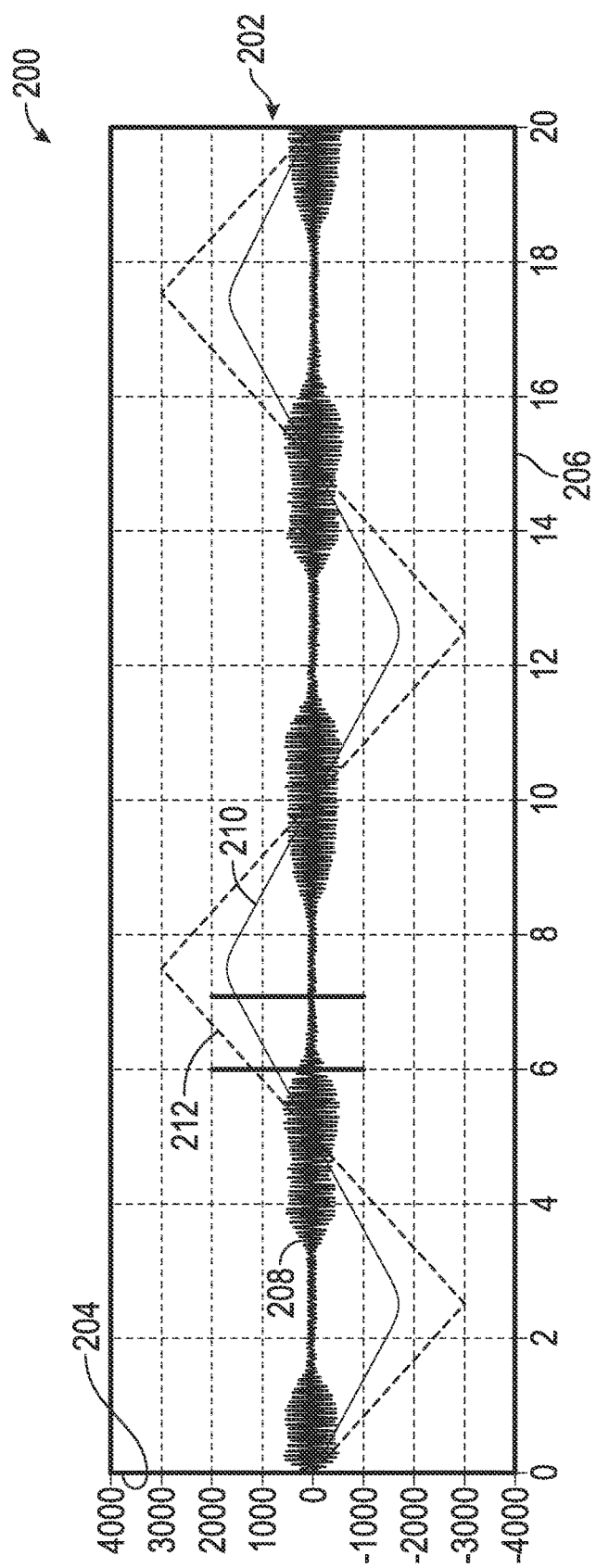
FIG. 7 is an exemplary chart generated by the control system of FIG. 5 in accordance with various embodiments.

For example, with reference to FIGS. 6 and 7, an exemplary chart 200 output by the UI control module 106 for display on the display 80 is illustrated, in which the chart 200 comprises a graphical representation of the performance data 110 and the test performance data 112. It should be noted that while the chart 200 is illustrated as being displayed on the display 80, the chart 200 can be part of a graphical user interface displayed by the display 80. In various embodiments, the graphical representation comprises a graph 202 of the performance data 110 and test performance data 112 over time. A y-axis 204 of the graph 202 represents the amplitudes and an x-axis 206 represents time in seconds (s). The performance data 110 is indicated by line 208, the test performance data 112 is indicated by line 210 and line 212. In this regard, the test performance data 112 comprises the load performance data 114, which is indicated by line 210, and the angle performance data 116, which is indicated by line 212. In one example, line 210 indicates measured load data 132 after a low pass filter with a corner frequency of 1.0 Hertz (Hz) is applied and line 212 indicates measured angle input data 136 after a gain of 100 is applied. Lines 210 and 212 provide visual indicators that the test of the steering system 22 is operating correctly. The performance data 110 indicated by line 208 provides a visual indicator as to the response of the steering system 22, 402, 502, 604 to the loads from the first load source 70, the second load source 72 and the angle input source 16. In one example, line 208 illustrates torque data 140 after a bandpass filter with corner frequencies of 13 Hertz (Hz) and 17 Hertz (Hz) and a gain of 1000 is applied. It should be noted that the chart 200 is merely exemplary, as any suitable graphical or textual representation can be employed to convey one or more of the performance data 110 and the test performance data 112. Moreover, the filters and gains applied to the measured load data 132, measured angle input data 136 and torque data 140 are merely exemplary.

The UI control module 106 can also generate user interface data 108 based on modulation data 118. As will be discussed further below, the modulation data 118 comprises a modulation of a response of the steering system 22, 402, 502, 604 to the loads applied by the first load source 70, the second load source 72 and the angle input source 16 and also indicates a performance of the steering system 22, 402, 502, 604. The modulation data 118 can be output as a separate chart or user interface for display on the display 80, or can be included on the chart 200 (FIGS. 3 and 4). For example, the UI control module 106 can generate a "PASS" or "FAIL" user interface for display on the display 80 based on the modulation data 118.

The UI control module 106 receives as input user input data 120 based on an operator's input to the input device 78 (FIG. 1). In one example, the user input data 120 comprises a command 122 for the operation of a test of the steering system 22, 402, 502, 604. For example, the user input data 120 can comprise a start command or a stop command for a test routine to determine the performance of the steering system 22, 402, 502, 604. It should be noted, however, that the user input data 120 can also comprise one or more parameters for the operation of the first load source 70, the second load source 72 and the angle input source 16. The UI control module 106 interprets and provides the command 122 for the test control module 102.

The test control module 102 receives as input the command 122. Based on the command 122, the test control module 102 queries a datastore 124. The datastore 124 stores one or more tables (e.g., lookup tables) that indicate a load to be applied by the first load source 70 and the second load source 72, and an angle input to be applied by the angle input source 16 based on the command 122. The one or more tables comprise calibration tables, which are acquired based on experimental data, and in one example, can comprise at least one table for the at least one load source 14 and one table for the angle input source 16. In various embodiments, the tables can be interpolation tables that are defined by one or more indexes. A target load test value 126 provided by at least one of the tables indicates a target load to be applied by the first load source 70 and the second load source 72 to the respective one of the first tie-rod 30 and the second tie-rod 32. A target angle test value 128 provided by at least one of the tables indicates a target angle input to be applied by the angle input source 16 to the input shaft 74, 412, 508, 618.

Based on the target load test value 126, the test control module 102 outputs load control data 130. In this regard, based on the target load test value 126, the test control module 102 outputs the load control data 130 to the at least one load source 14, and in this example, outputs the load control data 130 to each of the first load source 70 and the second load source 72. The load control data 130 comprises the one or more control signals for the first load source 70 and the second load source 72. Generally, the load control data 130 comprises one or more control signals to the first load source 70 and the second load source 72 to apply the first load at the first frequency and the second load at the second frequency. In one example, the first load is about 1750 Newton (N) representing a maximum of the first load at the first frequency and the second load is about 250 Newton (N) representing a maximum of the second load at the second frequency. The first frequency is about 0.1 Hertz (Hz) and the second frequency is about 15 Hertz (Hz). The waveshapes of the first frequency and the second frequency can be any shape with dominant frequency content at the respective frequencies. For example, triangular or sinewave shapes are convenient options amongst others known to those skilled in the art. In one example, a triangular waveshape is selected for the first load at the first frequency and a sinewave is selected for the second load at the second frequency.

Based on the target angle test value 128, the test control module 102 outputs angle control data 134. In this regard, based on the target angle test value 128, the test control module 102 outputs the angle control data 134 to the angle input source 16. The angle control data 134 comprises the one or more control signals for the angle input source 16. Generally, the angle control data 134 comprises one or more control signals for the angle input source 16 to rotate the input shaft 74, 412, 508, 618 between about −30 degrees and about 30 degrees relative to the longitudinal axis of the input shaft 74, 412, 508, 618 at a frequency of about 0.1 Hertz (Hz). In one example, the angle control data 134 changes as a function of the first load such that the maximum value of the first load is at a maximum angle. The first load is generally applied in a direction of opposing the motion generated by the angle input source 16. Stated another way, the angle control data 134 can output one or more control signals for the angle input source 16 such that the angle input source 16 rotates the input shaft 74, 412, 508, 618 to the maximum angle (e.g. about −30 degrees, about 30 degrees) at the maximum load (e.g. +1750 N, −1750 N) for the first load applied by the first load source 70.

The evaluation module 104 receives as input measured load data 132. The measured load data 132 comprises the sensor signals from the first force sensor 76 and the second force sensor 82. Thus, the measured load data 132 comprises sensor data regarding the first load, the first frequency, the second load and the second frequency output by the first load source 70 and the second load source 72 to the respective ones of the first tie-rod 30 and the second tie-rod 32. Stated another way, the measured load data 132 comprises sensor data regarding the loads (the first load and the second load) applied to the first tie-rod 30 and the second tie-rod 32 by the first load source 70 and the second load source 72 for the first frequency and the second frequency as measured and observed by the first force sensor 76 and the second force sensor 82.

Based on the measured load data 132, the evaluation module 104 determines the load performance data 114. In various embodiments, the evaluation module 104 applies a low pass filter of about 1.0 Hertz (Hz) to the measured load data 132 to generate the load performance data 114. The evaluation module 104 sets the load performance data 114 for the UI control module 106 and stores the load performance data 114 in a results datastore 142.

The evaluation module 104 also receives as input measured angle input data 136. The measured angle input data 136 comprises the sensor signals from the rotary sensor 84. Thus, the measured angle input data 136 comprises sensor data regarding the angle input output by the angle input source 16 to the input shaft 74, 412, 508, 618. Stated another way, the measured angle input data 136 comprises sensor data regarding the hand wheel angle input applied to the input shaft 74, 412, 508, 618 by the angle input source 16.

Based on the measured angle input data 136, the evaluation module 104 determines the angle performance data 116. The evaluation module 104 sets the angle performance data 116 for the UI control module 106 and stores the angle performance data 116 in the results datastore 142.

The evaluation module 104 receives torque data 140 as input. The torque data 140 comprises the sensor signals from the torque sensor 86. Based on the torque data 140, the evaluation module 104 determines the performance data 110 and the modulation data 118. In various embodiments, the evaluation module 104 applies a bandpass filter to the torque data 140 to arrive at the performance data 110. Generally, the bandpass filter is set to filter the torque data 140 between about 13 Hertz (Hz) and about 17 Hertz (Hz) to arrive at the performance data 110. The evaluation module 104 sets the performance data 110 for the UI control module 106 and stores the performance data 110 in the results datastore 142.

In various embodiments, the evaluation module 104 determines the modulation data 118 based on the performance data 110. In this regard, given the performance data 110, the evaluation module 104 calculates an envelope of the bandpassed carrier wave associated with the performance data 110. Generally, the bandpassed carrier wave has a periodic waveform. In one example, the envelope of the carrier wave is calculated using the following equation:

$$CWenv = |H(BP(CW))| \quad (1)$$

Wherein, CWenv is the envelope of the bandpassed carrier wave; BP(CW) is the bandpassed carrier wave from the performance data 110; H denotes a Hilbert transform applied to the bandpassed carrier wave BP(CW); and the vertical bars indicate an absolute value of the Hilbert transform H. The corner frequencies of the bandpass filter are proximate to the second frequency of the second load. The corner frequencies of the bandpass filter are user-selectable, and in one example, are set at a bandwidth of about 4 hz centered at the second frequency of the second load. The preferred order of the filter, furthermore, is set at 6, also resulting from a forward and reverse application of a 3rd order Butterworth filter. These operations, their consequences, alternative choices of filter implementations and orders are possible and well known to those skilled in the art.

Alternatively, the evaluation module 104 determines the modulation data 118 based on applying a low pass filter to the rectified bandpassed carrier wave of the performance data 110. In various embodiments, the low pass filtered rectified bandpassed carrier wave is calculated using the following equation:

$$CWlpf = F(|BP(CW)|) \quad (2)$$

Wherein CWlpf is the low pass filtered signal of the rectified, bandpass filtered carrier wave; F denotes a sixth order (forward-reverse application of a 3rd order Butterworth filter) low pass filter having a corner frequency of 5 Hertz (Hz); and BP(CW) is the bandpassed carrier wave from the performance data 110 as described previously using the Hilbert method for envelope detection in equation (1) of the preceding description. It should be noted that these operations, their consequences, alternative choices of filter implementations and orders are possible and well known to those skilled in the art.

Based on the envelope of the bandpassed carrier wave calculated from the performance data 110 in (1) or the low pass filtered rectified bandpassed carrier wave calculated from the performance data 110 in (2), the evaluation module 104 determines a percentage of modulation of the resultant periodic waveform. In one example, the percentage of modulation is calculated using the following equation:

$$\text{Modulation Index} = \frac{E_{max} - E_{min}}{E_{max} + E_{min}} \quad (3)$$

Wherein the Modulation Index is the modulation data 118; $E_{max}$ is the maximum or peak value of the envelope of the carrier wave calculated in (1) or the maximum or peak value of the low pass filtered carrier wave calculated in (2); and $E_{min}$ is the minimum value of the envelope of the carrier wave calculated in (1) or the minimum value of the low pass filtered carrier wave calculated in (2).

Based on the percentage of modulation, the evaluation module 104 sets modulation data 118 as pass or fail for the UI control module 106 and stores the modulation data 118 for the results datastore 142. Generally, if the percentage of modulation is about 20 percent or less, the evaluation module 104 sets the modulation data 118 as pass. If the percentage of modulation is greater than about 20 percent, then the evaluation module 104 sets the modulation data 118 as fail. If the modulation data 118 indicates a pass, then the steering system 22, 402, 502, 604 has an acceptable performance. If the modulation data 118 indicates a fail, then the performance of the steering system 22, 402, 502, 604 is unacceptable. With reference to FIG. 6, the steering system 22, 402, 502, 604 has an acceptable performance, and with reference to FIG. 7, the steering system 22, 402, 502, 604 has an unacceptable performance. It should be noted that setting the modulation data 118 to pass or fail is merely exemplary, as the evaluation module 104 can set the percentage of modulation as the modulation data 118 for the UI control module 106 to generate the user interface data 108, and can also store the percentage of modulation for the results datastore 142. It should be noted that other classifications of performance of the steering system 22, 402, 502, 604 are possible, and may, for example, comprise metrics merely relying on the level of the amplitude modulation along a continuum scale.

The results datastore 142 stores the performance data 110, the load performance data 114, the angle performance data 116 and the modulation data 118 received from the evaluation module 104. The results datastore 142 can be any non-volatile memory type that stores the information over the repeated use of the system 10. Further, while the results datastore 142 is illustrated as being associated with the diagnostic module 20 of the system 10, it should be noted that the results datastore 142 can be located remote from the system 10 and accessed through a suitable wired or wireless interface, as known to one skilled in the art.

Figure 8:
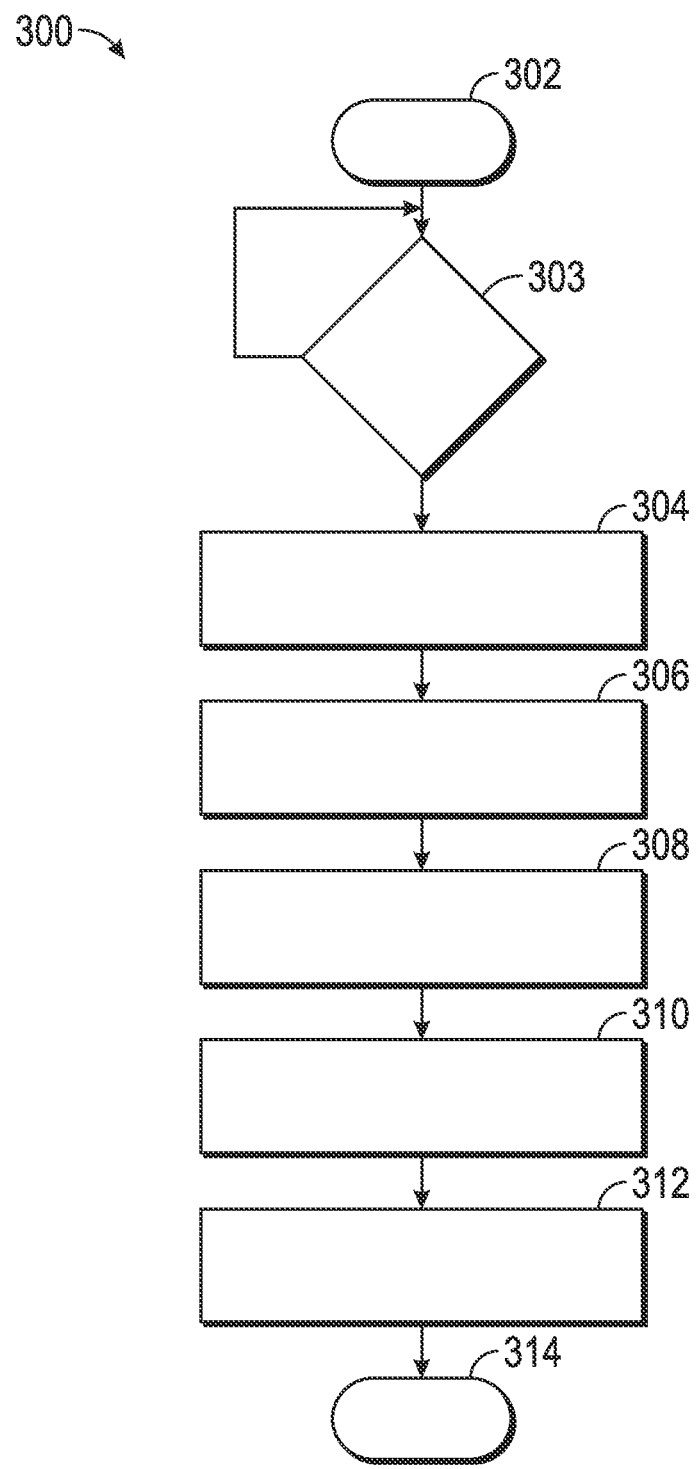
FIG. 8 is a flowchart illustrating a control method of the system of FIGS. 1-4 in accordance with various embodiments.

Referring now to FIG. 8, and with continued reference to FIGS. 1-5, a flowchart illustrates a control method that can be performed by the diagnostic module 20 of FIGS. 1-4 in accordance with the present disclosure. As can be appreciated in light of the disclosure, the order of operation within the method is not limited to the sequential execution as illustrated in FIG. 8, but may be performed in one or more varying orders as applicable and in accordance with the present disclosure.

In various embodiments, the method can be scheduled to run based on predetermined events, and/or can run based on the command 122 from the user input data 120.

With reference to FIG. 8, a method 300 for determining the performance of the steering system 22, 402, 502, 604 is shown. The method begins at 302. At 303, the method determines if the command 122 to start the testing routine has been received. If the command 122 has been received, the method proceeds to 304. Otherwise, the method continues with monitoring for the command 122 to start the testing routine.

At 304, the method retrieves the target load test value 126 from the datastore 124 and outputs the control signals to the at least one load source 14, and in this example, outputs the control signals to each of the first load source 70 and the second load source 72, to apply the first load at the first frequency and the second load at the second frequency to the first tie-rod 30 and the second tie-rod 32, respectively. At 306, the method retrieves the target angle test value 128 from the datastore 124 and outputs the control signals to the angle input source 16 to move or rotate the input shaft 74, 412, 508, 618. At 308, the method receives the sensor data 138 from the first force sensor 76, the second force sensor 82, rotary sensor 84 and the torque sensor 86. Stated another way, at 308, the method receives the measured load data 132 from the first force sensor 76 and the second force sensor 82, the measured angle input data 136 from the rotary sensor 84 and the torque data 140 from the torque sensor 86.

At 310, the method determines the performance data 110, the load performance data 114, the angle performance data 116 and the modulation data 118. At 312, the method outputs the performance data 110, the load performance data 114, the angle performance data 116 and the modulation data 118 as the chart 200 for display on the display 80 and stores the performance data 110, the load performance data 114, the angle performance data 116 and the modulation data 118 in the results datastore 142. The method ends at 314.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for determining a performance of a steering system, comprising:
    coupling a first tie-rod of the steering system to a first load source;
    coupling a second tie-rod of the steering system to a second load source;
    coupling an input shaft of a steering gear of the steering system to an angle input source;
    outputting one or more control signals by a processor to the first load source to apply a first load at a first frequency to the first tie-rod;
    outputting one or more control signals by the processor to the first load source to apply a second load at a second frequency to the first tie-rod, the first load greater than the second load and the first frequency is less than the second frequency;
    outputting one or more control signals by the processor to the angle input source to apply an input to the input shaft such that a maximum value of the first load is applied to the first tie-rod at a maximum angle of the input shaft; and
    receiving torque data indicating a performance of the steering system based on the load applied to the steering system by the first load source and the input applied by the angle input source.

2. The method of claim 1, further comprising:
    receiving input from a user input device; and
    outputting the one or more control signals to the first load source and the angle input source based on the input.

3. The method of claim 1, further comprising:
    outputting the torque data indicating the performance of the steering system to a display.

4. The method of claim 1, further comprising:
    outputting one or more control signals by the processor to the second load source to generate the first load at the first frequency; and outputting one or more control signals by the processor to the second load source to generate the second load at the second frequency.

5. The method of claim 1, further comprising:
filtering the torque data to generate performance data;
determining a percentage of modulation of the steering system based on the performance data;
comparing the percentage of the modulation of the steering system to a threshold value; and
determining that the performance of the steering system is acceptable based on the comparison.

6. The method of claim 1, wherein receiving the torque data indicating performance of the steering system comprises:
coupling a torque sensor to a second portion of the steering system; and
receiving the torque data from the torque sensor.

7. A system for determining a performance of a steering system, comprising:
a testing structure coupled to the steering system;
a first load source coupled to a first tie-rod of the steering system to apply a first load at a first frequency and a second load at a second frequency to the first tie-rod, the first load greater than the second load and the first frequency less than the second frequency;
a second load source coupled to a second tie-rod of the steering system to apply the first load at the first frequency and the second load at the second frequency to the second tie-rod;
an angle input source coupled to an input shaft of a steering gear of the steering system to apply an input to the input shaft; and
a diagnostic module, having a processor, that outputs one or more control signals to the each of the first load source and the second load source, outputs one or more control signals to the angle input source, the first load source and the second load source responsive to the one or more control signals to generate the first load at the first frequency and the second load at the second frequency, and the diagnostic module receives torque data indicating the performance of the steering system based on the output,
wherein the diagnostic module outputs the one or more control signals to the angle input source to rotate the input shaft such that a maximum value of the first load is applied to the first tie-rod at a maximum angle of the input shaft.

8. The system of claim 7, further comprising:
at least one sensor coupled to the steering system,
wherein the at least one sensor generates the torque data indicating the performance of the steering system.

9. The system of claim 7, further comprising:
a source of user input,
wherein the diagnostic module outputs the one or more control signals based on the user input.

10. The system of claim 7, further comprising:
a display,
wherein the diagnostic module outputs the torque data indicating the performance of the steering system for display on the display.

11. A system for determining a performance of a steering system, comprising:
a testing structure to support the steering system, the steering system including at least a first tie-rod, a second tie-rod, an input shaft and a steering gear, the steering gear coupled to the first tie-rod and the second tie-rod and the input shaft coupled to the steering gear;
a first load source coupled to the first tie-rod that applies a first load at a first frequency and a second load at a second frequency to the first tie-rod, the first load greater than the second load and the first frequency less than the second frequency;
a second load source coupled to the second tie-rod that generates the first load at the first frequency and the second load at the second frequency to the second tie-rod;
an angle input source coupled to the input shaft to provide an input to the steering gear; and
a diagnostic module that outputs one or more control signals to the first load source, the second load source and the angle input source, the first load source and the second load source responsive to the one or more control signals to generate the first load at the first frequency and the second load at the second frequency, the diagnostic module receives torque data indicating the performance of the steering system based on the output, filters the torque data to determine performance data, determines a percentage of modulation based on the performance data, and determines the performance of the steering system as acceptable based on the percentage of modulation as less than a threshold value,
wherein the diagnostic module outputs the one or more control signals to the angle input source to rotate the input shaft such that a maximum value of the first load is applied to the first tie-rod at a maximum angle of the input shaft.

12. The system of claim 11, further comprising:
a torque sensor coupled to the input shaft,
wherein the torque sensor generates the torque data indicating the performance of the steering system.

13. The system of claim 11, further comprising:
a display,
wherein the diagnostic module outputs the torque data indicating the performance of the steering system for display on the display.

* * * * *